United States Patent
Cromer et al.

(10) Patent No.: US 7,480,265 B2
(45) Date of Patent: Jan. 20, 2009

(54) SYSTEM AND METHOD FOR AUTONOMIC EXTENSIONS TO WAKE ON WIRELESS NETWORKS

(75) Inventors: Daryl Carvis Cromer, Apex, NC (US); Philip John Jakes, Durham, NC (US); Howard Jeffrey Locker, Cary, NC (US); Randall Scott Springfield, Chapel Hill, NC (US)

(73) Assignee: Lenovo (Sinapore) Pte. Ltd., Singapore (SG)

( * ) Notice: Subject to any disclaimer, the term of this patent is extended or adjusted under 35 U.S.C. 154(b) by 1196 days.

(21) Appl. No.: 10/727,004

(22) Filed: Dec. 3, 2003

(65) Prior Publication Data

US 2005/0122926 A1  Jun. 9, 2005

(51) Int. Cl.
*G08C 17/00* (2006.01)
*H04B 1/16* (2006.01)

(52) U.S. Cl. ............... 370/311; 370/338; 455/343.3; 455/343.4; 455/574

(58) Field of Classification Search ............. 370/310, 370/311, 326, 338, 345, 908, 912, 913; 455/342.1, 455/342.2, 342.3, 342.4, 574, 343.1, 343.2, 455/343.3, 343.4; 709/217, 219, 223, 225, 709/226, 229
See application file for complete search history.

(56) References Cited

U.S. PATENT DOCUMENTS

| | | | | |
|---|---|---|---|---|
| 5,625,882 | A | | 4/1997 | Vook et al. .............. 455/38.3 |
| 6,067,297 | A | * | 5/2000 | Beach ..................... 370/311 |
| 6,073,255 | A | | 6/2000 | Nouri et al. ............... 714/31 |
| 6,163,849 | A | | 12/2000 | Nouri et al. .............. 713/324 |
| 6,266,721 | B1 | | 7/2001 | Sheikh et al. ............. 710/100 |
| 6,304,899 | B1 | | 10/2001 | Cromer et al. ........... 709/217 |
| 6,311,276 | B1 | * | 10/2001 | Connery et al. ............. 726/2 |
| 6,332,202 | B1 | | 12/2001 | Sheikh et al. ............. 714/39 |
| 6,381,636 | B1 | | 4/2002 | Cromer et al. ........... 709/211 |
| 6,532,500 | B1 | | 3/2003 | Li et al. .................... 710/15 |
| 6,915,346 | B1 | * | 7/2005 | Kato et al. ............... 709/217 |
| 7,158,778 | B2 | * | 1/2007 | Sameer et al. ........... 455/574 |
| 7,251,736 | B2 | * | 7/2007 | Dayan et al. ............. 709/217 |

* cited by examiner

*Primary Examiner*—Quochien B Vuong
(74) *Attorney, Agent, or Firm*—VanLeeuwen & VanLeeuwen; Carlos Munoz Bustamante

(57) ABSTRACT

A system and method for autonomic extensions to wake on LAN are presented. An access point detects wake on LAN (WOL) requests that are targeted for unassociated clients. When the access point detects a WOL request for an unassociated client, the access point stores the WOL request in a table for a predefined amount of time. A client queries the access point periodically to see if the access point is storing a WOL request which is targeted for the client. When the access point receives the query, the access point compares the client's identifier, such as its MAC address, with targeted client identifiers corresponding to pending WOL requests. When the access point detects a match, the access point sends the WOL request to the client for the client to process.

20 Claims, 8 Drawing Sheets

| Associated Clients | IP Address | MAC Address |
|---|---|---|
| 1 | 192.68.500.1 | 7439A5F3E658 |
| 2 | 192.68.500.2 | 3499A5A3E642 |
| ⋮ | ⋮ | ⋮ |
| n | 192.68.500.n | 8479C5F3E6A2 |

Figure 2A

| Clients WOL Pending | IP Address | MAC Address | Timestamp |
|---|---|---|---|
| 7 | | 1479A5F3E642 | 9:15 |
| 8 | | 647BA5F35643 | 9:18 |
| ⋮ | ⋮ | ⋮ | ⋮ |
| y | | 2469C5F3E64D | 10:12 |

Figure 2B

SYSTEM AND METHOD FOR AUTONOMIC EXTENSIONS TO WAKE ON WIRELESS NETWORKS

BACKGROUND OF THE INVENTION

1. Technical Field

The present invention relates in general to a system and method for autonomic extensions to wake on wireless network. More particularly, the present invention relates to a system and method for implementing a wake on LAN mode into a wireless network such that a wireless client conserves power consumption.

2. Description of the Related Art

Within the past two decades, the development of raw computing power coupled with the proliferation of computer devices has grown at exponential rates. This phenomenal growth, along with the advent of the Internet, has led to a new age of accessibility to other people, other systems, and to information.

The simultaneous explosion of information and integration of technology into everyday life has brought on new demands for how people manage and maintain computer systems. The demand for information technology professionals is already outpacing supply when it comes to finding support for someone to manage complex, and even simple computer systems. As access to information becomes omnipresent through personal computers, hand-held devices, and wireless devices, the stability of current infrastructure, systems, and data is at an increasingly greater risk to suffer outages. This increasing complexity, in conjunction with a shortage of skilled information technology professionals, points towards an inevitable need to automate many of the functions associated with computing today.

Autonomic computing is one proposal to solve this technological challenge. Autonomic computing is a concept to build a computer system that regulates itself much in the same way that a person's autonomic nervous system regulates and protects the person's body. One enabling technology of autonomic computing is wake on LAN (WOL). In a wired network, WOL mode enables an Ethernet controller to check directed and broadcast packets to determine if the packets include a WOL packet. The physical layer wakes a computer system once it receives a WOL packet that is intended for the computer system.

A challenge found, however, is extending the WOL mode into a wireless network. Extending the current implementation in a wireless environment requires a wireless device to continually be in "receive" mode, checking for data packets. Receive mode, however, consumes a significant amount of power which is not desirable in a wireless environment where a majority of clients are operating off of battery power.

In addition, by having each wireless client receive packets that may eventually be discarded, the wireless network is inundated with meaningless data packets which result in a reduction of bandwidth for other users that are sending and receiving important data packets. What is needed, therefore, is a system and method for implementing a wake on LAN mode in a wireless network environment while conserving power consumption and reducing wireless network traffic.

SUMMARY

It has been discovered that the aforementioned challenges are resolved by storing wake on LAN (WOL) requests at an access point and providing the WOL requests to targeted clients when the targeted clients query the access point. Each client is assigned a particular timeslot to query the access point. At the client's assigned timeslot, the client comes out of sleep mode and queries the access point. When the access point has a WOL request that is intended for the client, the access point sends the WOL request to the client, for the client to process.

An administrator console manages a particular computer environment in which an access point and a client are included. The administrator console sends data packets to the client using the access point's wireless transmission medium, such as 802.11 (a, b, g). The access point receives a data packet from the administrator console and identifies the data packet's targeted client. The access point then determines if the target client is associated with the access point. A client is associated with the access point when the client is within range of the access point's wireless network and the client is sending and/or receiving packets to/from the access point. When the target client is associated with the access point, the access point sends the data packet directly to the target client.

In a situation when a target client is not associated with the access point (i.e. the client is powered off or hibernate/sleep mode), the access point determines if the data packet includes a WOL request and, if so, stores the WOL request in a table. The client is modified to send periodic queries to the access point during its assigned timeslot. The access point compares the client's MAC address with MAC addresses corresponding to pending WOL requests stored in the table to determine if the client has a pending WOL request. When the access point matches the client's MAC address with a MAC address that corresponds to a pending WOL request, the access point sends the WOL request to the client. Once the client receives the WOL request, the client activities a Power Managed Event (PME) signal on its PCI bus, and client processing commences as a result of receiving the WOL request.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 2A is a table showing associated client entries;

FIG. 2B is a table showing wake on LAN (WOL) requests that are waiting for target clients to associate themselves with an access point;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
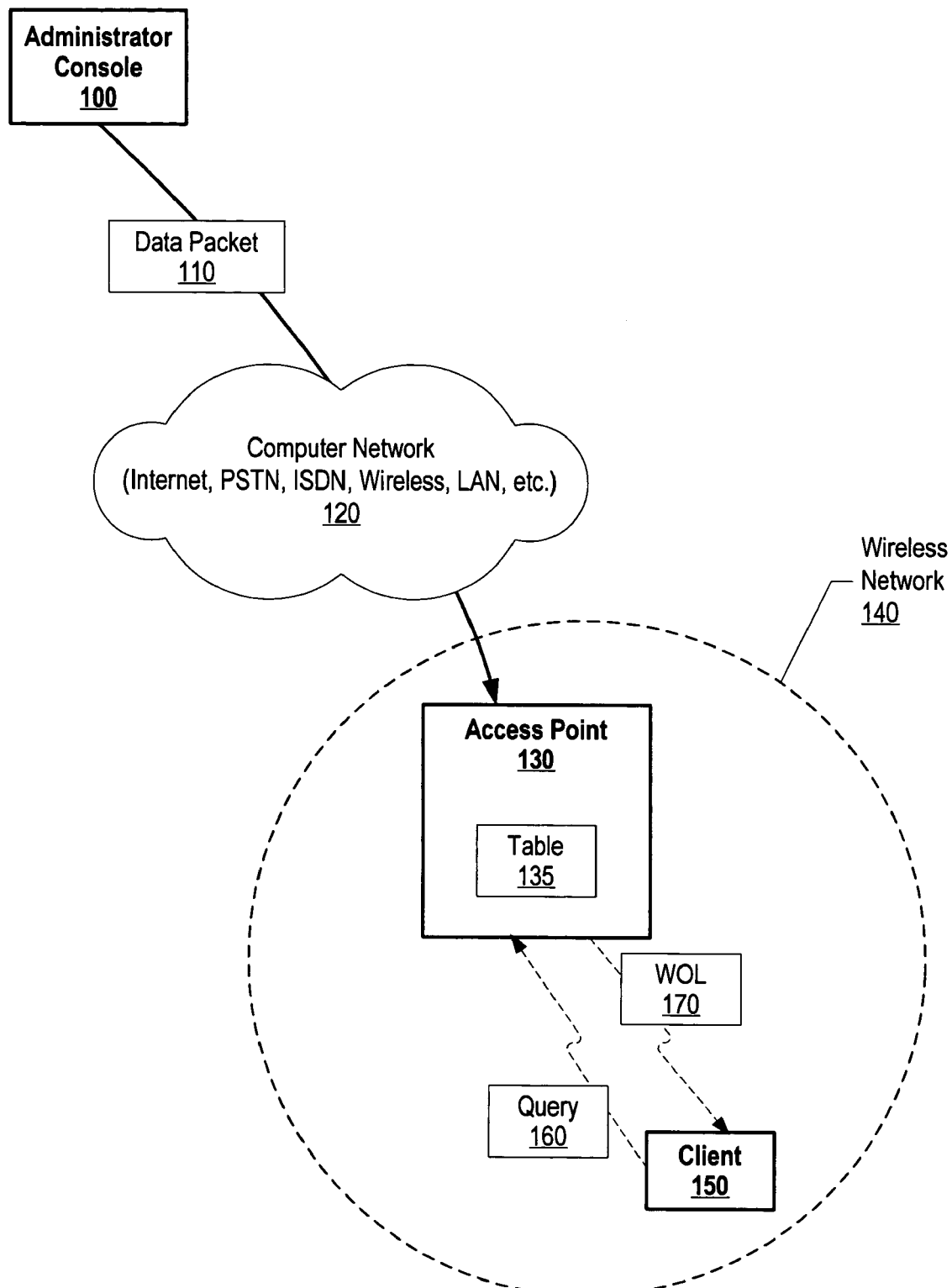
FIG. 1 is a diagram of an access point receiving a data packet from an administration console, and sending a stored wake on LAN (WOL) request to a client.

FIG. 1 is a diagram of an access point receiving a data packet from an administration console, and sending a stored wake on LAN (WOL) request to a client. Administrator console 100 manages a particular computer environment in which access point 130 and client 150 are included. Administrator console 100 sends data packets to client 150 using access point 130 in order for client 150 to perform particular functions, such as executing a WOL request.

Administrator console 100 sends data packet 110 to access point 130 over computer network 120, such as the Internet. Access point 130 receives data packet 110 through a network connection, such as an Ethernet port, and identifies a client that is targeted to receive data packet 110. Access point 130 then determines if the target client is currently associated with access point 130. A client is associated with access point 130 if the client is within range of access point 130's wireless network (e.g. wireless network 140) and currently sending and/or receiving packets to/from the access point. If the target client is currently associated with access point 130, access point 130 sends data packet 110 to the target client. Access point 130 transmits and receives data packets to/from clients using wireless network 140 whereby wireless network 140's footprint may be circular in nature if access point 130's antenna is omni-directional. For example, wireless network 140 may be a using wireless technology such as 802.11a, 802.11b, or 802.11g.

In a situation when a target client is not currently associated with access point 130, access point 130 determines if data packet 110 includes a WOL request and, if so, stores the WOL request in table 135 until the target client associates itself with access point 130 or until access point 130 removes the WOL request from table 135 after a particular time frame. For example, client 150 may not be transmitting or receiving data packets and, therefore, is mot associated with access point 130. Table 135 may be stored on a volatile storage area, such as volatile memory.

Client 150 periodically sends a query access point 130 to see if access point 130 is holding a WOL request for client 150. Client 150 sends query 160 to access point 130 whereby query 160 includes client 150's identifier (i.e. MAC address).

Access point 130 compares client 150's MAC address with MAC addresses corresponding to pending WOL requests to determine if administrator console 100 has sent a WOL request to client 150. If access point 130 matches client 150's MAC address with a MAC address that corresponds to a pending WOL request, access point 130 sends WOL 170 to client 150. Once client 150 receives WOL 170, client 150 performs particular PME operations (see FIG. 9 and corresponding text for further details regarding PME operations).

FIG. 2A is a table showing associated client entries. Table 200 includes associated clients, corresponding IP addresses, and corresponding MAC addresses. When an access point establishes communication with a client, the access point enters the client's IP and MAC address in table 200 in order to track clients that are associated with the access point. Table 200 includes column 210, column 220, and column 222. Column 210 includes client names, or identifiers, corresponding to each associated client. Columns 220 and 222 include a list of IP addresses and MAC addresses, respectively, that corresponds to each of the client names.

Rows 225 through 235 include particular clients that are associated with the access point. Row 225 includes client "1" which has a corresponding IP address of "192.68.500.1" and a MAC address of "7439A5F3E658." Row 230 includes client "2" which has a corresponding IP address of "192.68.500.2" and a MAC address of "3499A5A3E642." Row 235 includes client "n" which has a corresponding IP address of "192.68.500.n" and a MAC address of "8479C5F3E6A2." Table 200 is included in table 135 that is shown in FIG. 1. In addition to tracking associated clients, table 135 also includes a table area that tracks pending wake on LAN (WOL) requests that are targeted to unassociated clients (see FIG. 2B and corresponding text for further details regarding pending WOL requests).

FIG. 2B is a table showing wake on LAN (WOL) requests that are waiting for their target client to associate itself with an access point. Table 240 stores WOL requests that are targeted for clients that are not currently associated with an access point. Table 240 includes columns 250, 260, 265, and 270. Column 250 includes a list of the names of clients that currently have a pending WOL stored in the access point. Column 260 includes a list of IP addresses that correspond to each of the client names and remains blank until the client associates itself with the access point. Column 265 includes a list of client MAC addresses that correspond to the each pending WOL request.

Column 270 is a timestamp of when the access point received the WOL request from an administrator console. The access point periodically checks each pending WOL request to determine whether one or more of the pending WOL requests should be removed from table 240 based upon the amount of time that each of the pending WOL requests has been in the table (see FIG. 3 and corresponding text for further details regarding pending WOL clean-up procedures).

Row 275 includes a pending WOL request for client "7" that has a MAC address of "1479A5F3E642." Row 275's WOL request was received (e.g. time stamped) at "9:15". Row 280 includes a pending WOL request for client "8" that has a MAC address of "647BA5F35643." Row 280's WOL request was received at "9:18". Row 285 includes a pending WOL request for client "y" that has a MAC address of "2469C5F3E64D." Row 285's WOL request was received at "10:12".

Figure 3:
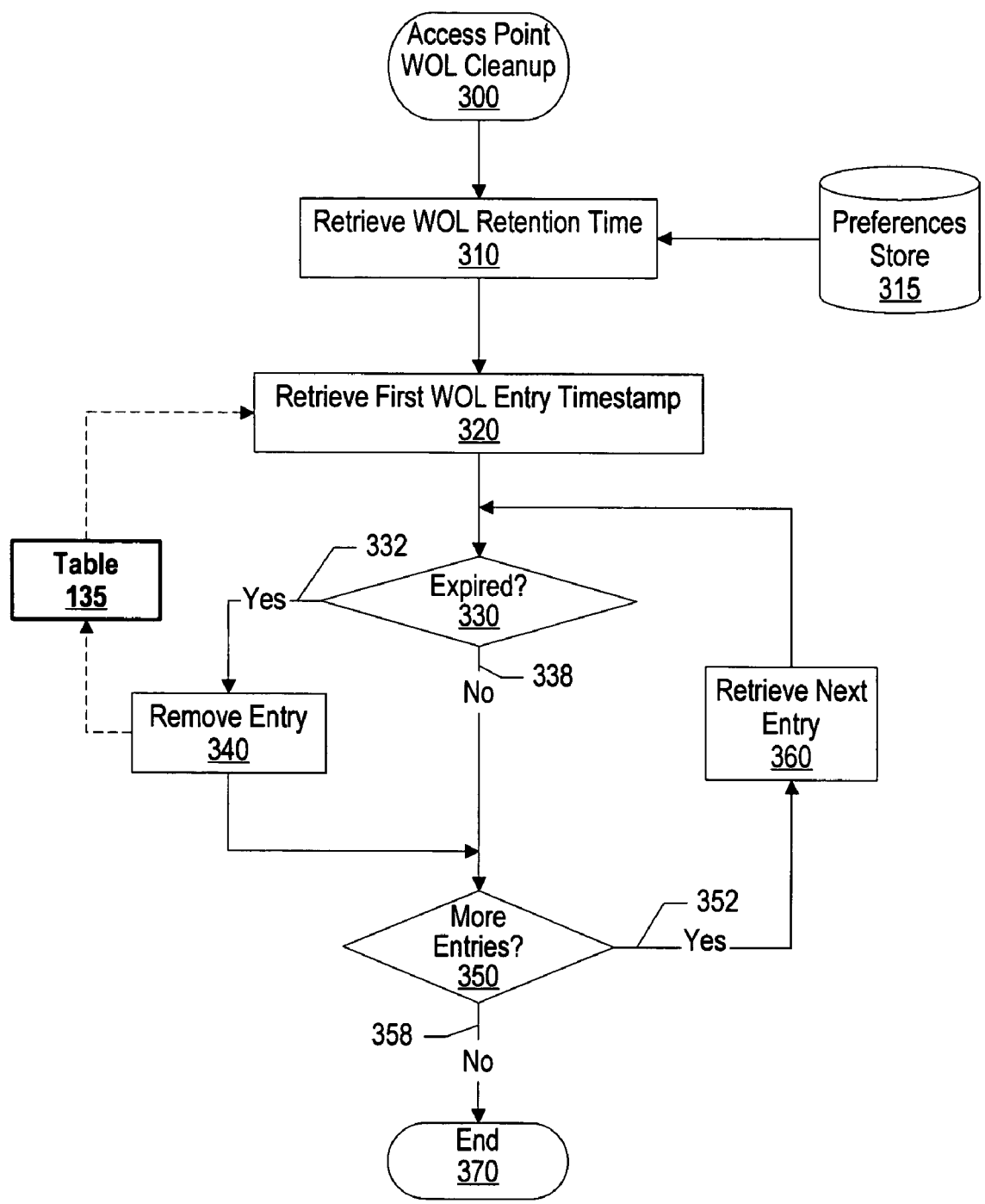
FIG. 3 is a flowchart showing steps taken in an access point cleaning up stored WOL requests.

FIG. 3 is a flowchart showing steps taken in an access point cleaning up stored WOL requests. WOL clean up commences at 300, whereupon the access point retrieves a retention time from preference store 315 at step 310. For example, a system administrator may set the amount of time to retain each WOL for ten minutes.

Processing retrieves a first pending WOL from table 135 at step 320. The pending WOL entry includes a time stamp which corresponds to the time at which the pending WOL was received by the access point (see FIG. 2B and corresponding text for further details regarding pending WOL entries). Preferences store 315 may be stored on a nonvolatile storage area, such as a computer hard drive.

A determination is made as to whether the pending WOL entry is expired by identifying the amount of time that the pending WOL has been stored with the retention time (decision 330). For example, assuming the retention time is ten minutes, if the pending WOL entry has a time stamp of "9:00"

and the current time is "9:15", the pending WOL entry has been stored for fifteen minutes, which is greater than the retention time, and, thereby, the access point should remove the pending WOL entry from table 135. If the pending WOL entry has expired, decision 330 branches to "Yes" branch 332 whereupon processing removes the pending WOL entry from table 135 at step 340. On the other hand, if the pending WOL entry has not expired, decision 330 branches to "No" branch 338 bypassing entry removal steps.

A determination is made as to whether there are more pending WOL entries in table 135 (decision 350). If there are more pending WOL entries, decision 350 branches to "Yes" branch 352 which loops back to retrieve (step 360), and process the next table entry. This looping continues until there are no more table entries to process, at which point decision 350 branches to "No" branch 358 whereupon table clean-up processing ends at 370.

In one embodiment, the access point associates a timer with each table entry which counts down from a pre-defined retention time. In this embodiment, the access point may identify pending WOL entries whose counters have reached zero and remove those pending WOL entries from the table.

Figure 4:
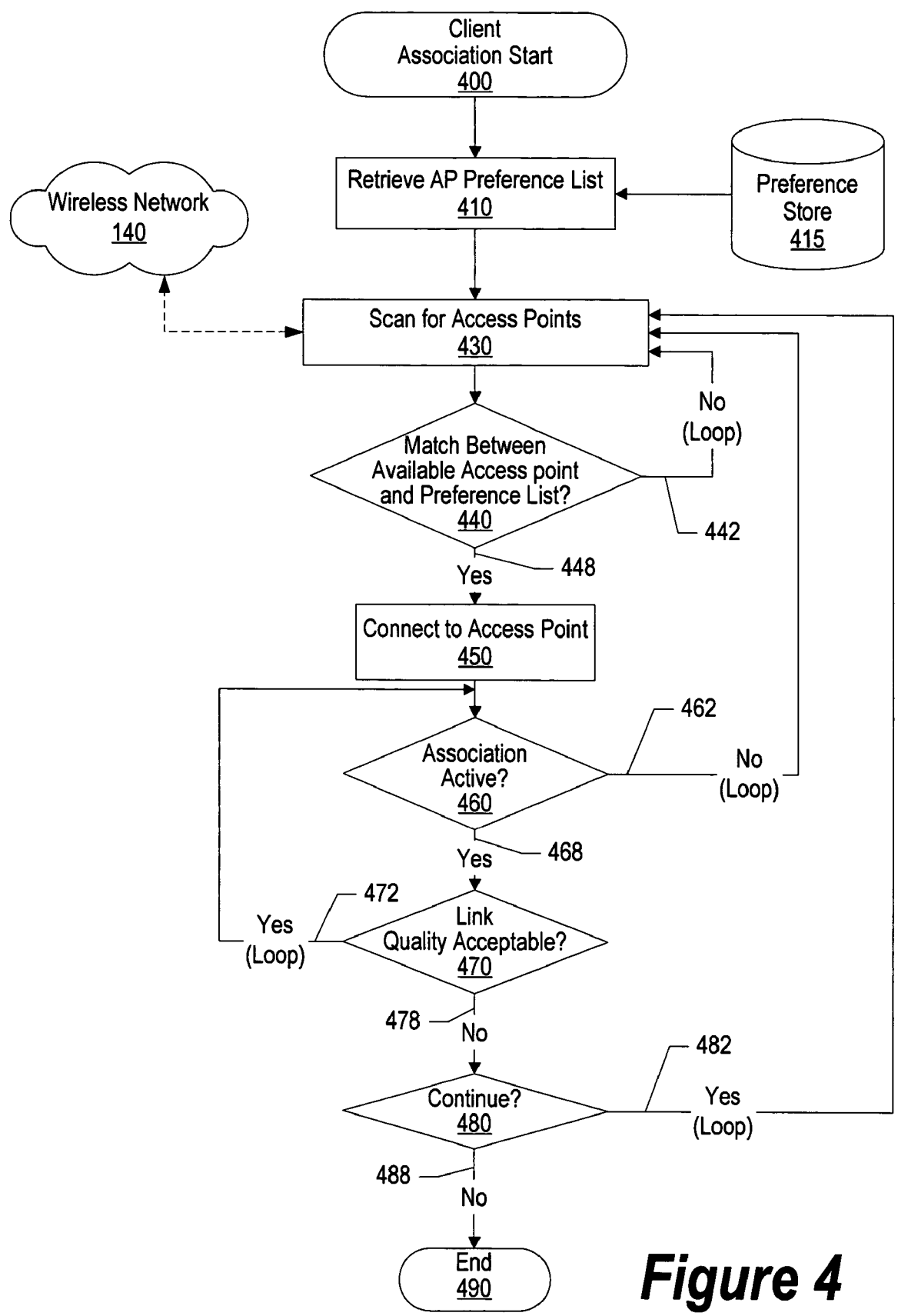
FIG. 4 is a flowchart showing steps taken in a client associating itself to an access point.

FIG. 4 is a flowchart showing steps taken in a client associating itself to an access point. Processing commences at 400, whereupon the client retrieves an access point preference list from preference store 415 which includes a list of preferred access points (step 410). For example, the preference list may include a default access point as the client's most preferred access point. Preference store 415 may be stored on a nonvolatile storage area, such as a computer hard drive.

Processing scans wireless network 140 to detect the existence of access points at step 430. Wireless network 140 is a wireless network in which the client communicates with an access point, such as 802.11a, 802.11b, 802.11g, or Bluetooth. A determination is made as to whether the client detected an access point that matches the client's access point preference list (decision 440). If a detected access point does not match the client's access point preference list, decision 440 branches to "No" branch 442 which loops back to continue searching for different access points. This looping continues until the client detects an access point that matches the client's access point preference list, at which point decision 440 branches to "Yes" branch 448 whereupon the client connects to the matched access point at step 450.

A determination is made as to whether the client is actively associated with the connected access point (decision 460). For example, the access point may not associate the client due to capacity issues or due to the inability to authenticate client due to difference in security protocols. If the client is not associated with the access point, decision 460 branches to "No" branch 462 which loops back to search for a different access point. This looping continues until the client detects an access point and is associated with the access point, at which point decision 460 branches to "Yes" branch 468.

A determination is made as to whether the quality of the wireless link is acceptable between the client and the access point (decision 470). For example, the client may have criteria to drop an access point connection if the link quality drops below 15%. If the link quality is acceptable, decision 470 branches to "Yes" branch 472 which loops back to continue monitoring the client's association and link quality with the access point. This looping continues until the link quality becomes unacceptable, at which point decision 470 branches to "No" branch 478. For example, a client may be mobile and be on the fringe of the access point's wireless network.

A determination is made as to whether to continue client processing (decision 480). If client processing should continue, decision 480 branches to "Yes" branch 482 which loops back to scan for access points. This looping continues until client processing should stop (i.e. shut down), at which point decision 480 branches to "No" branch 488 whereupon processing ends at 490.

Figure 5:
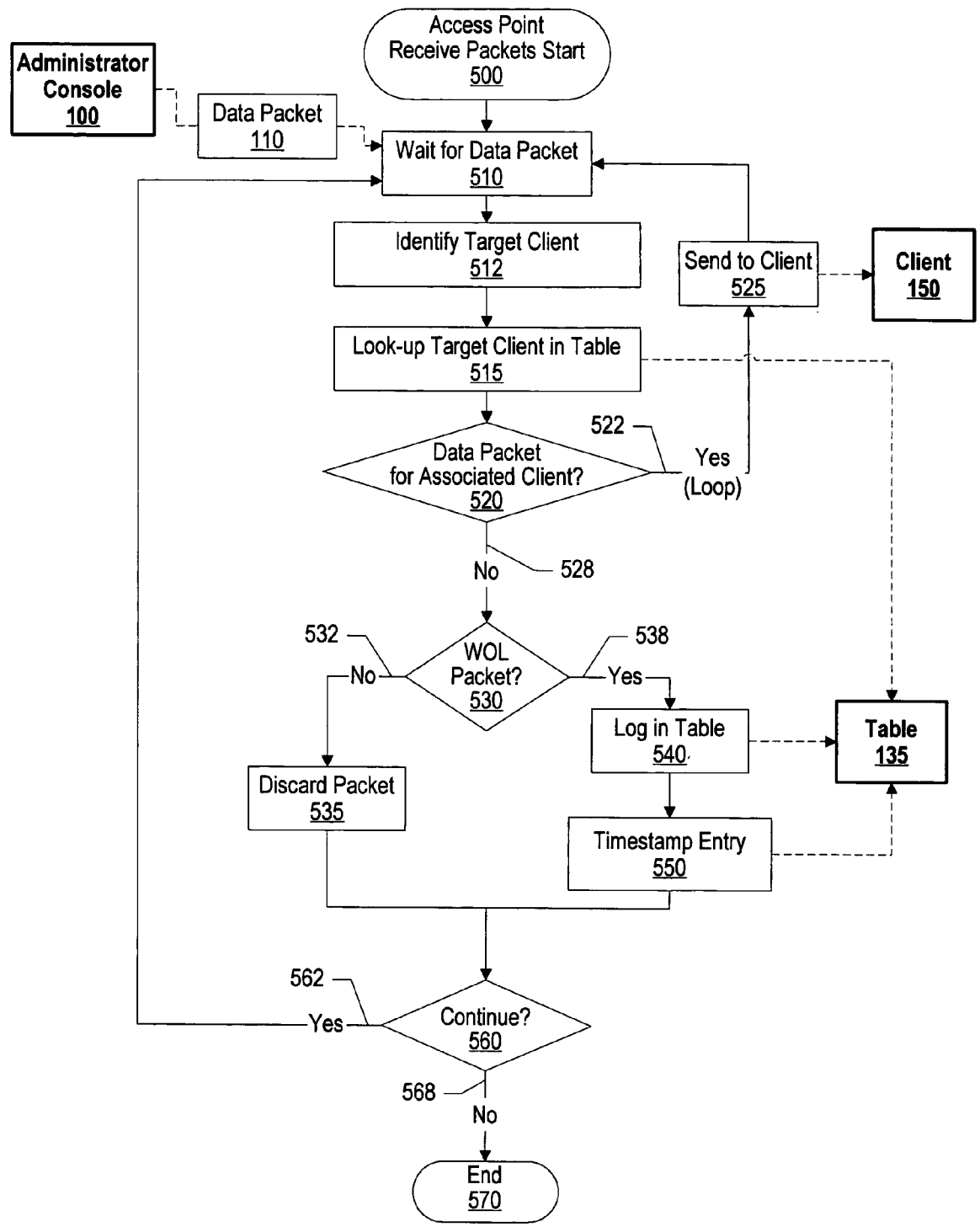
FIG. 5 is a flowchart showing steps taken in an access point receiving packets and storing wake on LAN (WOL) requests intended for unassociated clients.

FIG. 5 is a flowchart showing steps taken in an access point receiving packets and storing wake on LAN (WOL) requests intended for unassociated clients. Processing commences at 500, whereupon processing waits for a data packet from administrator console 100 (step 510). The access point may receive data packets from administrator console 100 over a computer network, such as the Internet (see FIG. 1 and corresponding text for further details).

Once the access point receives a data packet (e.g. data packet 110) from administrator 100, processing identifies a client in which data packet 110 is targeted (step 512). Processing checks if the target client is currently associated with the access point by matching the target client's identifier (i.e. MAC address) with associated client entries included in table 135 at step 515 (see FIG. 2A and corresponding text for further details regarding associated client entries).

A determination is made as to whether the data packet is targeted for a currently associated client (decision 520). If the data packet is targeted for a currently associated client, decision 520 branches to "Yes" branch 522 which sends the data packet to the associated client (step 525), such as client 150, and loops back to wait for more data packets. This looping continues until the access point receives a data packet that is not targeted for a currently associated client, at which point decision 520 branches to "No" branch 528.

A determination is made as to whether the received data packet is a wake on LAN (WOL) packet (decision 530). If the data packet is not a WOL packet, decision 530 branches to "No" branch 532 whereupon processing discards the packet at step 535. On the other hand, if the data packet is a WOL packet, decision 530 branches to "Yes" branch 538 whereupon processing logs the WOL packet and the target client's name and MAC address in table 135 at step 540 (see FIG. 2B and corresponding text for further details regarding log entry attributes). Processing time stamps the log entry at step 550 which is used by the access point during log entry clean-up procedures (see FIG. 3 and corresponding text for further details regarding log entry clean-up procedures).

A determination is made as to whether access point processing should continue (i.e. shut down) (decision 560). If access point processing should continue, decision 560 branches to "Yes" branch 562 which loops back to wait for more data packets. This looping continues until access point processing should stop, at which point decision 560 branches to "No" branch 568 whereupon processing ends at 570.

Figure 6:
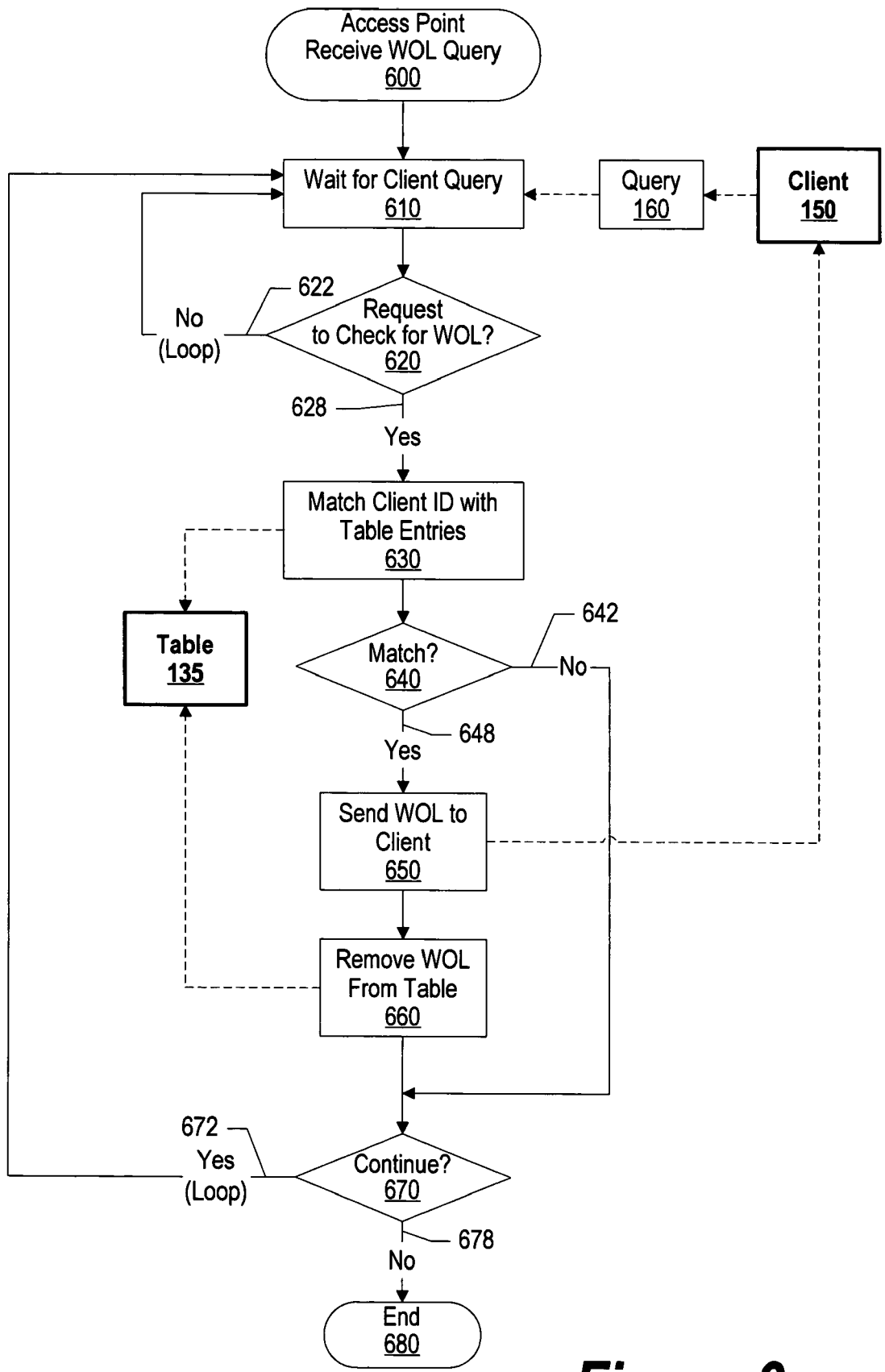
FIG. 6 is a flowchart showing steps taken in an access point receiving a wake on LAN (WOL) query from a client.

FIG. 6 is a flowchart showing steps taken in an access point receiving a wake on LAN (WOL) query from a client. A client, such as client 150, periodically queries the access point as to whether the access point has received a WOL request from an administrator console that is intended for the client.

Processing commences at 600, whereupon processing waits for a query from client 150 (step 610). When processing receives a query (e.g. query 160) from client 150, a determination is made as to whether query 160 includes a request to check if a pending WOL request is intended for client 150 (decision 620). If query 160 is not a request to check pending WOL requests, decision 620 braches to "No" branch 622 which loops back to wait for another client query. This looping continues until the access point receives a query from client 150 that includes a request to check pending WOL requests, at which point decision 620 branches to "Yes" branch 628.

Processing matches client 150's identifier (i.e. MAC address) with pending WOL table entries included in table 135 at step 630 (see FIG. 2B and corresponding text for further details regarding pending WOL table entry attributes). A determination is made as to whether processing matched client 150's identifier with one of the pending WOL table entries (decision 640). If processing did not detect a match, decision 640 branches to "No" branch 642 bypassing WOL sending steps. On the other hand, if processing detected a match, decision 640 branches to "Yes" branch 648 whereupon processing sends the WOL request to client 150 at step 650, and removes the pending WOL table entry from table 135 at step 660.

A determination is made as to whether to continue access point processing (decision 670). If processing should continue, decision 670 branches to "Yes" branch 672 which loops back to wait for more client queries. This looping continues until processing should stop, at which point decision 670 branches to "No" branch 678 whereupon processing ends at 680.

Figure 7:
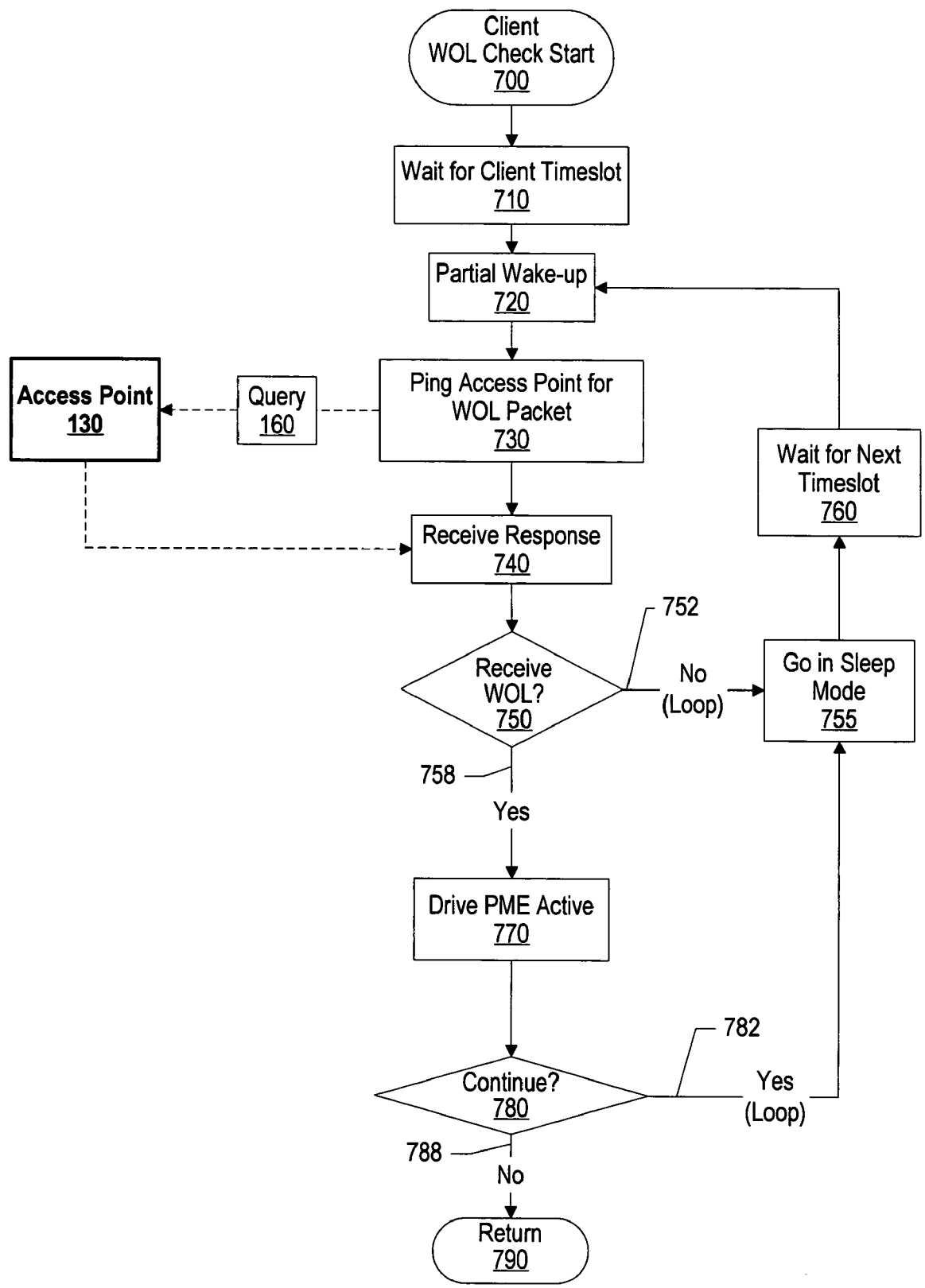
FIG. 7 is a flowchart showing steps taken in a client querying an access point to check if the access point has stored a wake on LAN (WOL) request pertaining to the client.

FIG. 7 is a flowchart showing steps taken in a client querying an access point to check if the access point has stored a wake on LAN (WOL) request pertaining to the client. In order to conserve battery life, the client is in a sleep mode until it is the client's turn for access point querying.

Processing commences at 700, whereupon processing is in sleep mode until it is the client's turn to query an access point (step 710). At its timeslot, processing partially wakes-up at step 720, and sends query 160 to access point 130 which requests access point 130 to determine if access point 130 is holding a pending WOL request for the client.

Processing receives a response from access point 130 at step 740, and a determination is made as to whether the access point sent a WOL request to the client (decision 750). If access point did not send a WOL request to the client, decision 750 branches to "No" branch 752 whereupon processing loops back to return to sleep mode (step 755) and wait for the client's next time slot to wake-up (step 760). This looping continues until the client receives a WOL request from access point 130, at which point decision 750 branches to "Yes" branch 758 whereupon processing drives PME active. The PME signal is detected by the power management logic, which powers up the system. A determination is made as to whether client processing should continue (i.e. shut down) (decision 780). If processing should continue, decision 780 branches to "Yes" branch 782 which loops back to return to sleep mode (step 755) and wait for the client's next time slot (step 760). This looping continues until processing should stop, at which point decision 780 branches to "No" branch 788 whereupon processing ends at 790.

Figure 8:
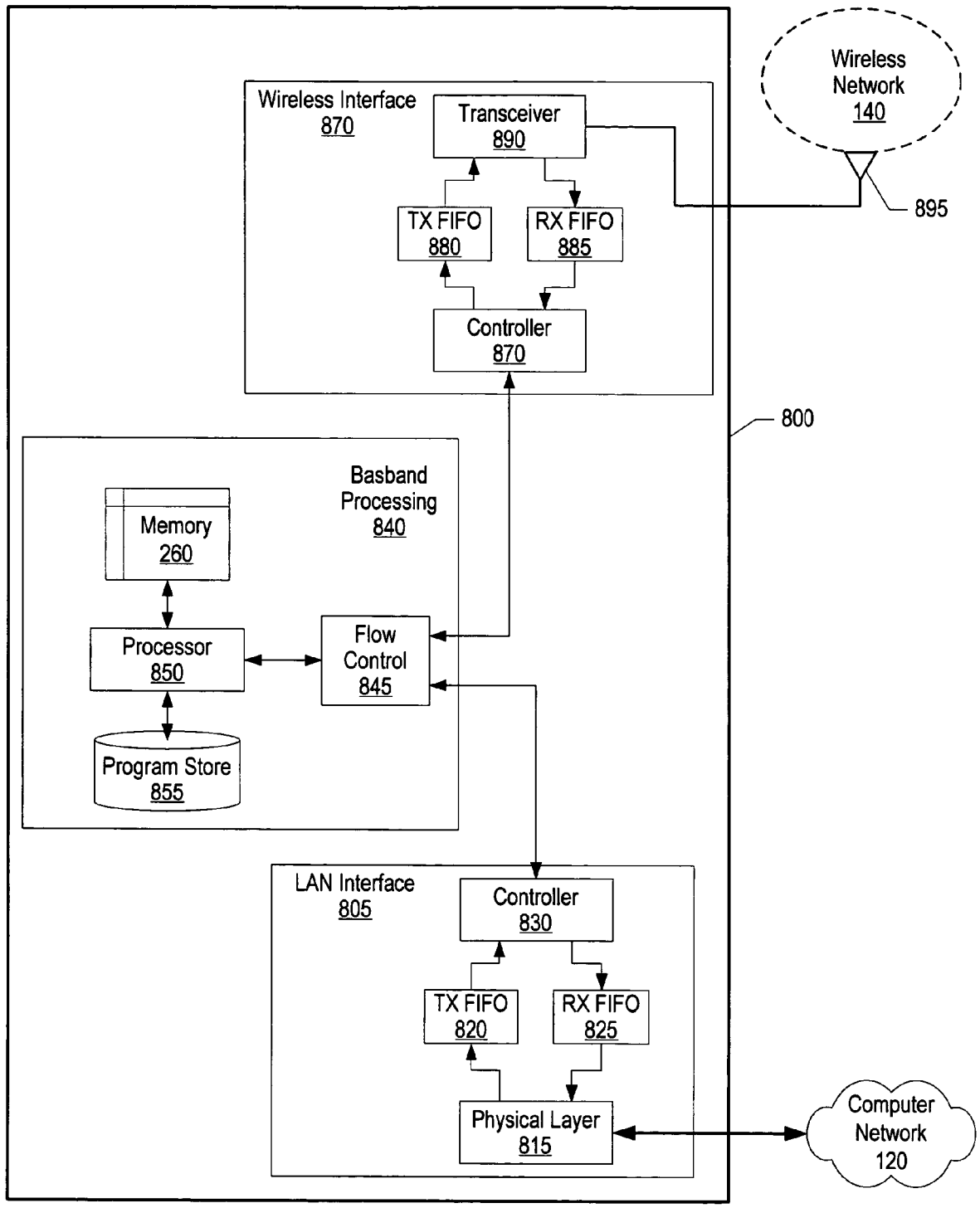
FIG. 8 is a block diagram of an information handling system capable of implementing the present invention.

FIG. 8 is a block diagram of an information handling system capable of implementing the present invention. FIG. 8 illustrates information handling system 800 which is a simplified example of an access point capable of performing the computing operations described herein. Access point 800 includes three modules which are LAN interface 805, base band processing 840, and wireless interface 870. LAN interface 805 includes physical layer 815 which provides an interface, such as Ethernet, to computer network 120. TX FIFO 820 and RX FIFO 825 couples physical layer 815 to controller 830 and provides buffering for transmit and receive data packets.

Controller 830 couples to flow control 845 which is included in base band processing 840 through a standard bus, such as a PCI or ISA bus. Flow control 845 couples to processor 850 which manages base band operations. Processor 850 couples to program store 855 to retrieve program information. Program store 855 is a non-volatile storage device, such as non-volatile memory. Processor 850 is also coupled to memory 260 which stores table entry information described herein. Memory 260 is a volatile storage device, such as volatile memory.

Flow control 845 interfaces with controller 870 through a standard bus, such as a PCI or ISA bus. TX FIFO 880 and RX FIFO 885 couple controller 870 to transceiver 890 and are used to buffer transmission and reception of data packets that are sent to and received from a client over wireless network 140. Transceiver 890 is coupled to antenna 895 which transmits and receives data packets over wireless network 140.

While the computer system described in FIG. 8 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method of handling a client request in a wireless computer network, said method comprising:
    entering into a sleep mode at a wireless client;
    while in the sleep mode at the wireless client, detecting a timeslot that corresponds to the wireless client;
    in response to detecting the timeslot, awakening from sleep mode and sending a query from the wireless client to a wireless access point;
    receiving the query at the wireless access point from the wireless client;
    identifying whether a wake on LAN request corresponds to the wireless client in response to receiving the query; and
    sending the wake on LAN request to the wireless client in response to the identification.

2. The method of claim 1 further comprising:
    receiving a data packet;
    detecting whether the data packet includes the wake on LAN request; and
    storing the wake on LAN request in response to the detection.

3. The method of claim 2 further comprising:
    generating a timestamp to correspond with the wake on LAN request; and
    associating the timestamp with the wake on LAN request.

4. The method of claim 3 further comprising:
    retrieving a retention time;
    determining whether to remove the wake on LAN request using the retention time and the timestamp; and
    removing the wake on LAN request based upon the determination.

5. The method of claim 2 wherein the data packet corresponds to a target client, the method further comprising:
    recognizing whether the target client is an associated client; and
    performing the storing in response to the recognizing.

6. The method of claim 1 wherein the wireless computer network is selected from the group consisting of 802.11a, 802.11b, 802.11g, and Bluetooth.

7. The method of claim 1 wherein the identifying is performed using the wireless client's MAC address.

8. An information handling system comprising:
    one or more processors;
    a memory accessible by the processors;
    a wireless computer network;
    one or more nonvolatile storage devices accessible by the processors; and
    a client request handling tool for handling a client request in the wireless computer network, the client request handling tool comprising software code effective to:
        receive a query from a wireless client from the wireless computer network, wherein the wireless client is adapted to detect, while in sleep mode, a timeslot that corresponds to the wireless client and, in response to detecting the timeslot, send the query to the client request handling tool;
        identify whether a wake on LAN request corresponds to the wireless client in response to receiving the query; and
        send the wake on LAN request to the wireless client using the wireless computer network in response to the identification.

9. The information handling system of claim 8 wherein the software code is further effective to:
    receive a data packet over a wired computer network;
    detect whether the data packet includes the wake on LAN request; and
    store the wake on LAN request in one of the nonvolatile storage devices in response to the detection.

10. The information handling system of claim 9 wherein the software code is further effective to:
    generate a timestamp to correspond with the wake on LAN request; and
    associate the timestamp with the wake on LAN request.

11. The information handling system of claim 10 wherein the software code is further effective to:
    retrieve a retention time from one of the nonvolatile storage devices;
    determine whether to remove the wake on LAN request using the retention time and the timestamp; and
    remove the wake on LAN request from one of the nonvolatile storage devices based upon the determination.

12. The information handling system of claim 9 wherein the data packet corresponds to a target client, the software code further effective to:
    recognize whether the target client is an associated client; and
    perform the storing in one of the nonvolatile storage devices in response to the recognizing.

13. The information handling system of claim 8 wherein the identifying is performed using the wireless client's MAC address.

14. A computer program product stored in a computer readable medium, comprising functional descriptive material that, when executed by an information handling system, causes the information handling system to perform actions that include:
    receiving a query from a wireless client, wherein the wireless client is adapted to detect, while in sleep mode, a timeslot that corresponds to the wireless client and, in response to detecting the timeslot, send the query to the information handling system;
    identifying whether a wake on LAN request corresponds to the wireless client in response to receiving the query; and
    send the wake on LAN request to the wireless client in response to the identification.

15. The computer program product of claim 14 wherein the wherein the information handling system further performs actions that include;
    receiving a data packet;
    detecting whether the data packet includes the wake on LAN request; and
    storing the wake on LAN request in response to the detection.

16. The computer program product of claim 15 wherein the information handling system further performs actions that include;
    generating a timestamp to correspond with the wake on LAN request; and
    associating the timestamp with the wake on LAN request.

17. The computer program product of claim 16 wherein the information handling system further performs actions that include;
   retrieving a retention time;
   determining whether to remove the wake on LAN request using the retention time and the timestamp; and
   removing the wake on LAN request based upon the determination.

18. The computer program product of claim 15 wherein the data packet corresponds to a target client, the information handling system further performing actions that include;
   recognizing whether the target client is an associated client; and
   performing the storing in response to the recognizing.

19. The computer program product of claim 14 wherein the wireless computer network is selected from the group consisting of 802.11a, 802.11b, 802.11g, and Bluetooth.

20. The computer program product of claim 14 wherein the identifying is performed using the wireless client's MAC address.

* * * * *